April 24, 1928.
L. MARTINO
AUTOMOBILE SIGNAL
Filed Jan. 24, 1922
1,667,165
2 Sheets-Sheet 1
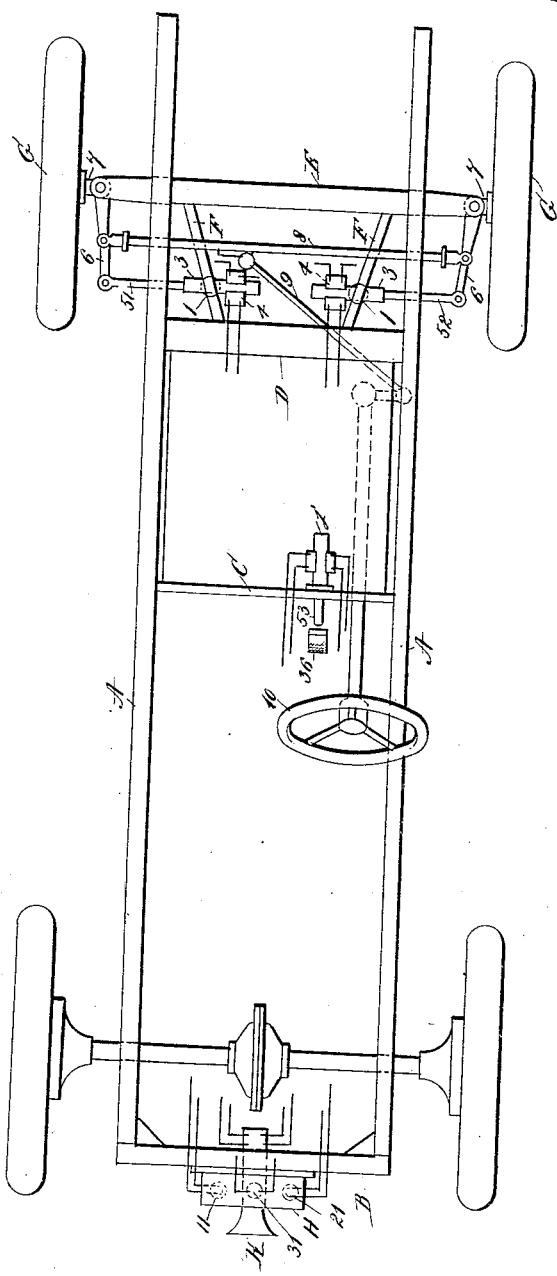
INVENTOR:
Letterio Martino
By
ATTORNEYS:

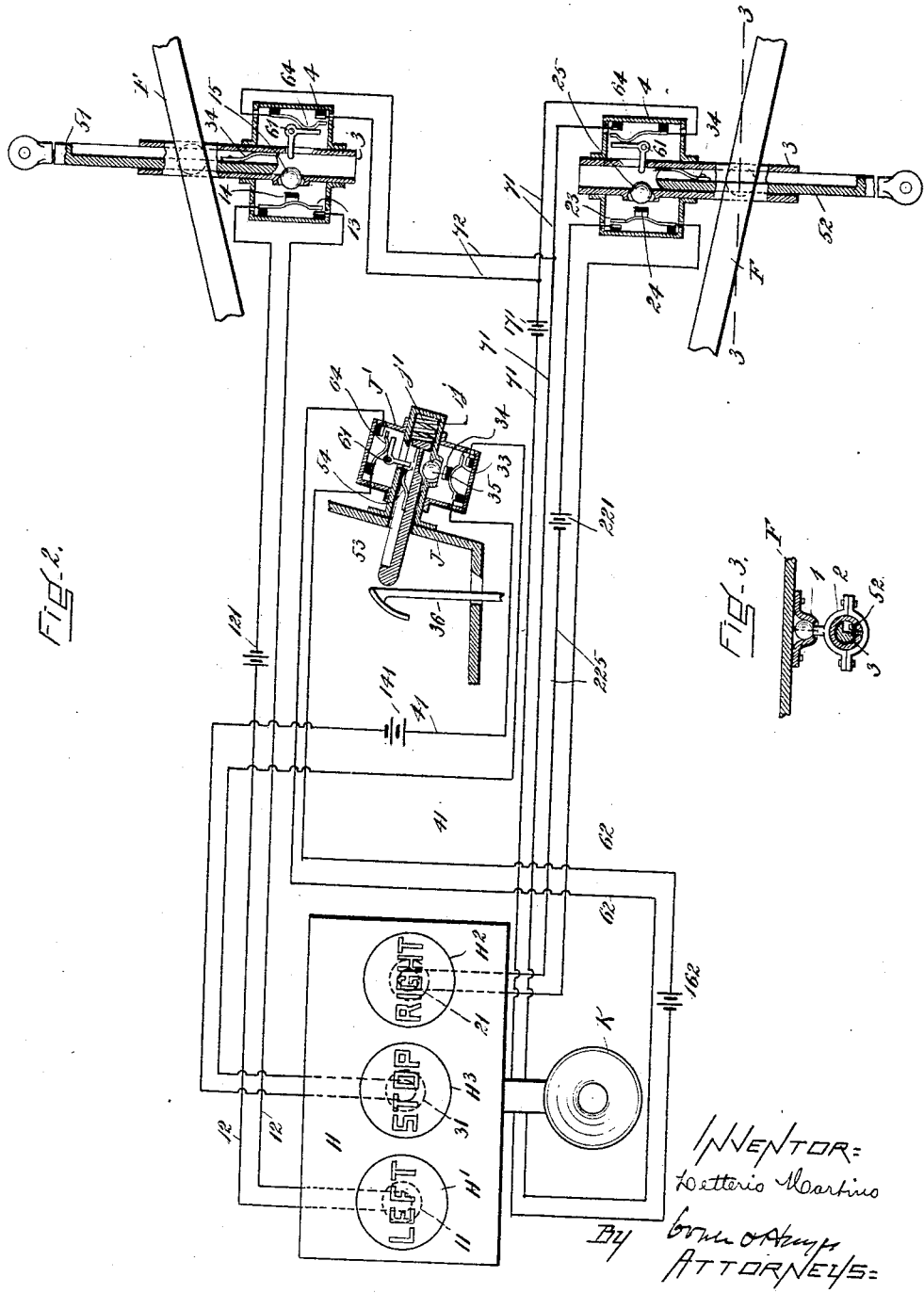

Patented Apr. 24, 1928.

1,667,165

UNITED STATES PATENT OFFICE.

LETTERIO MARTINO, OF EVERETT, MASSACHUSETTS.

AUTOMOBILE SIGNAL.

Application filed January 24, 1922. Serial No. 531,383.

My improvement relates to means for giving signals from an automobile to a car or person behind to indicate whether the automobile is being slowed down, about to turn a corner or otherwise and, if so, in which direction it is to be turned. I have found by experience that light signals are not sufficient to give notice to a rear car that the front car is about to stop or turn, because the driver of the rear car is often somewhat inattentive to the movements of the car in front. I have therefore coupled with the light signal system a horn which sounds for a limited time when any light signal is being utilized. My invention comprises an arrangement which will bring about the result together with certain details of construction and application which be understood by reference to the drawings.

Figure 1 is a plan view of so much of an automobile frame as is necessary to illustrate my invention.

Fig. 2 is a diagrammatic view showing the arrangement of the various parts and circuits, and Fig. 3 is a section on line 3—3 of Fig. 2.

The frame shown is that of a Ford car and comprises side bars A, a rear bar B, cross bars C and D, an axle bar E braces F and wheels G.

Under each brace is hung a ball bearing 1 which carries below it a strap 2 in which is mounted a tubular casing 3 near one end thereof, the other end of the casing carrying a switch box 4. In the casing 3 on the left of the car is mounted a slide rod 51, which is grooved along one side and one end of which is pivotally connected to the end of the short link 6 which is pivotally connected at its other end to the bell crank lever 7, which carries the axle of the wheel in the usual way. The mechanism is duplicated at the other side of the car, the casing, slide rod, etc., however, being in reversed relation. A connecting rod 8 connects the links 6 and the usual connections are made by the link 9, etc. with the steering wheel 10, this construction being such that the turning of the steering wheel 10 controls the front wheels of the car and also the position of the slide rods in the casings 3. The corresponding parts on the right of the car are similarly numbered, the slide rod, however, being numbered 52.

At the rear of the car is located a box H having three openings, closed preferably by glass plates H¹, H³, H², which may be different in color and as shown are marked, respectively, "Left", "Stop", "Right". Behind each glass plate is located an electric light 11, 21, 31, each in its own circuit, the closing of which is controlled by one of the slide rods 51, 52 in the act of steering the car or stopping it as the case may be, in the following manner:—

The lamp 11 is connected by the wires 12, through the battery 121, with a spring circuit closer 13 normally open and carrying an insulated projection 14 adapted to be engaged by a ball 15 carried in the casing 3 in such a manner that it may be pushed outwardly only. As the slide rod 51 is moved into the casing its end, which is preferably slightly curved, pushes the ball 15 out of its way and against the projection 14, thus pushing the circuit closer into circuit-closing position and closing the lamp circuit. When, for example, the wheels are turned to the left, the circuit will be closed through the lamp 11 behind the glass sign H¹ and the word "Left" will appear at the rear of the car.

If the car is to turn a corner to the right, the lamp 21 is lighted in the same way, the circuit being through the wire 225, battery 221, spring circuit closer 23, all governed by the slide rod 52 on the right of the car, which acts through the ball 25 and the insulated projection 24.

The stop light at H³ is similarly operated from the brake lever 36 which engages a slide rod 53 running in the casing $j$ attached to the foot board J. This casing is provided with a ball 35 normally projecting into it and adapted to be pressed outwardly to engage the spring 34 in the switch box J¹ and operate the circuit closer 33 to close a circuit which comprises the wires 32, battery 321 and lamp 31. On pressing the brake lever 36, which is mounted and operates in the usual way, the slide rod 53 is pushed into the casing closing the circuit so that the lamp 31 behind the glass sign "Stop" will become incandescent and the word "Stop" will appear. The end of the casing $j$ is closed and within it is a spring $j^1$ which tends to keep the outer end of the slide rod 53 in proximity to the brake lever 36.

As stated above, the appearance of a sign at the rear of a car is often not enough to attract a driver who may be talking with some one in the car, so I have combined with these signals an electric horn which may be of any construction capable of making a signal on closing an electric circuit, and which preferably is sounded for a very short time, sufficient only to call attention to the light signal.

This horn is located at the rear of the car and may be hung below the box H as at K. As shown it is connected with two circuits, one comprising the wires 41 and battery 141 and a spring circuit closer operated by the slide rod 53, and the other connected to be operated by the slide rods 51 and 52 as described below.

A bell crank lever 61 pivoted to a wall of the switch box J, one arm of which projects through a slot in the casing j, lies in the path of a cam surface 54 on the slide rod 53 so that when the slide rod is moved inwardly by the brake lever 36 the cam surface 54 will strike the projecting arm of the bell crank 61 and throw the other arm of the bell crank against a spring circuit closer 64 which closes the circuit through the wires 62, battery 162 and the horn K. As the cam surface 54 passes under the bell crank 60 it contacts with its projecting arm and pushes it up so that the other arm of the bell crank operates the circuit closer 64. The circuit closer closes the circuit only momentarily when the cam surface is passing under it so that the horn gives only a short blast.

Each of the two switch boxes 4 contains a similar mechanism similarly lettered so that as either of the slide rods 51 or 52 is pushed into its casing by the action of the steering wheel, its cam surface causes the bell crank 61 to close a circuit which comprises a battery 171 and wires 71, which lead say to the steering mechanism of the right hand wheel and a branch 72 which leads to the steering mechanism of the left hand wheel.

It will be noted that each of the three switch boxes 4, 4 and J, contains two normally open switches, and that each slide-rod 51, 52 and 53 is provided with two switch-closing parts, to wit, the curved or rounded end surfaces which are arranged to engage the balls 15, 25 and 35, to close one of each of these switches, and the spring members 34, 34 and 54 which are arranged to engage the bell-crank levers 61 to close the other of each of these switches at a single movement of each of these slide-rods, so that two signals are rendered effective simultaneously when a slide rod is moved for this purpose.

As will be clear to one skilled in the art, the details of construction of the apparatus shown in the drawings may be varied without departing from my invention which relates mainly to a combination of a horn and other instrumentalities such that any change of direction or slowing down of the car will be indicated not only to the eye but also to the ear of a possible observer.

It will also be clear that the details of construction may readily be changed so that my device may be attached to any other type of car than that shown, the point being that the turning signals shall be operated from the steering wheel.

What I claim as my invention is:—

In a vehicle electric signal system, a switch box containing two normally open switches, one of which comprises a two-armed, spring-pressed lever, and the other of which comprises a ball, combined with a slide rod having a member to engage one arm of said lever, and having also a rounded shoulder part to engage said ball; whereby both of said switches may be closed, to render two signals operative, by a longitudinal movement of said slide rod.

LETTERIO MARTINO.